United States Patent
Ohashi et al.

(10) Patent No.: US 12,474,312 B2
(45) Date of Patent: Nov. 18, 2025

(54) PH MANAGEMENT SYSTEM OF LIQUID CHROMATOGRAPH AND COMPUTER READABLE RECORDING MEDIUM RECORDING PROGRAM

(71) Applicant: SHIMADZU CORPORATION, Kyoto (JP)

(72) Inventors: Hiroshi Ohashi, Kyoto (JP); Hidetoshi Terada, Kyoto (JP); Yusuke Osaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 769 days.

(21) Appl. No.: 17/542,259

(22) Filed: Dec. 3, 2021

(65) Prior Publication Data

US 2022/0178891 A1    Jun. 9, 2022

(30) Foreign Application Priority Data

Dec. 9, 2020 (JP) ................................ 2020-204099

(51) Int. Cl.
*G01N 30/88* (2006.01)
*G01N 30/02* (2006.01)

(52) U.S. Cl.
CPC ....... *G01N 30/88* (2013.01); *G01N 2030/027* (2013.01)

(58) Field of Classification Search
CPC ......... G01N 2030/027; G01N 27/4167; G01N 30/34; G01N 30/88
See application file for complete search history.

(56) References Cited

U.S. PATENT DOCUMENTS

| | | | |
|---|---|---|---|
| 4,859,342 A | 8/1989 | Shirasawa et al. | |
| 5,892,458 A | 4/1999 | Anderer et al. | |
| 2004/0087031 A1* | 5/2004 | Simon, Jr. .......... | G01N 27/4167 436/100 |
| 2007/0144973 A1 | 6/2007 | Tsonev et al. | |

(Continued)

FOREIGN PATENT DOCUMENTS

| | | |
|---|---|---|
| CN | 106662556 A | 5/2017 |
| CN | 213210022 U | 5/2021 |

(Continued)

OTHER PUBLICATIONS

Notice of Reasons for Refusal in corresponding Japanese Patent Application No. 2020-204099 dated Nov. 21, 2023, with English machine translation.

(Continued)

*Primary Examiner* — Kristina M Deherrera
*Assistant Examiner* — Gedeon M Kidanu
(74) *Attorney, Agent, or Firm* — Renner, Otto, Boisselle & Sklar, LLP

(57) ABSTRACT

A pH management system of a liquid chromatograph includes a pH meter that measures a pH value of a mobile phase in the liquid chromatograph, and a warner that presents a warning in a case where it is determined that a pH value measured in the pH meter is different from a set pH value, or that the pH value measured in the pH meter deviates from the set pH value and an error rate exceeds a predetermined error rate, when the pH value measured in the pH meter and the set pH are compared to each other.

4 Claims, 9 Drawing Sheets

(56) References Cited

U.S. PATENT DOCUMENTS

| | | | |
|---|---|---|---|
| 2011/0073548 | A1 | 3/2011 | Williams et al. |
| 2015/0019141 | A1 | 1/2015 | Ohashi |
| 2016/0310049 | A1* | 10/2016 | Rowe ................... A61B 5/681 |
| 2017/0234839 | A1 | 8/2017 | Terada et al. |
| 2018/0080952 | A1* | 3/2018 | Lehtonen ................. B65B 3/26 |
| 2018/0276235 | A1 | 9/2018 | Rudge et al. |
| 2019/0369070 | A1* | 12/2019 | Terada ................... G01N 30/86 |
| 2020/0158698 | A1* | 5/2020 | Ohashi ............... G01N 30/8658 |
| 2020/0348270 | A1* | 11/2020 | Nakayama ............ G01N 30/24 |

FOREIGN PATENT DOCUMENTS

| | | | |
|---|---|---|---|
| JP | 63-096552 | A | 4/1988 |
| JP | 01-250060 | A | 10/1989 |
| JP | H01250060 | * | 10/1989 |
| JP | 01-292250 | A | 11/1989 |
| JP | 09-171022 | A | 6/1997 |
| JP | 2007-500852 | A | 1/2007 |
| JP | 2013-506127 | A | 2/2013 |
| JP | 2015-017924 | A | 1/2015 |
| WO | 2020/084785 | A1 | 4/2020 |

OTHER PUBLICATIONS

Office Action in corresponding Chinese Patent Application No. 202111430766.X dated Aug. 17, 2023, with English machine translation.

Office Action for corresponding Chinese Patent Application No. 202111430766.X dated Apr. 30, 2024, with English machine translation.

Office Action in corresponding Chinese Patent Application No. 202111430766.X dated Aug. 7, 2024, with English machine translation.

Decision of Rejection in corresponding Chinese Patent Application No. 202111430766.X dated Oct. 17, 2024, with English machine translation.

Notice of Reasons for Refusal in corresponding Japanese Patent Application No. 2024-031427 dated Nov. 12, 2024, with English machine translation.

Office Action in corresponding Chinese Patent Application No. 202111430766.X dated Mar. 28, 2025, with English machine translation.

* cited by examiner

EXAMPLE OF pH GRADIENT

PH MANAGEMENT SYSTEM OF LIQUID CHROMATOGRAPH AND COMPUTER READABLE RECORDING MEDIUM RECORDING PROGRAM

BACKGROUND

Technical Field

The present invention relates to a system and computer readable recording medium recording a program that manage a pH of a solvent flowing in a liquid chromatograph.

Description of Related Art

A liquid chromatograph has been known as a device for analyzing substances included in a sample. The liquid chromatograph includes a pump unit, an autosampler unit, a column oven unit, a system controller and so on. In the liquid chromatograph described in the below-mentioned JP 2015-017924 A, a solvent in which an aqueous solvent and an organic solvent are mixed is supplied to an analysis flow path as a mobile phase. A sample is added to the mobile phase in the analysis flow path. The sample that has been introduced into the separation column together with the mobile phase is separated into components in the separation column. The sample separated into components in the separation column is detected by the detector. A chromatogram is created based on a result of detection by the detector.

In a computer, an analysis method that is set in the liquid chromatograph is created. Method scouting for optimizing a parameter of an analysis method in accordance with a sample to be analyzed is performed in order to improve peak resolution of a chromatogram. The parameter of the analysis method includes an injection amount of sample, the type of a separation column, the temperature of a column oven, a detection wavelength in a detector or a pH of a mobile phase, for example.

SUMMARY

In a case where pH values of mobile phases are different, the peak resolution of chromatograms may vary greatly. Even in a case where the pH value of a mobile phase is optimized by the method scouting, the pH of a mobile phase may be different from an expected value due to a method of preparing a solvent, an environment, etc.

An object of the present invention is to properly manage a pH of a mobile phase flowing in a liquid chromatograph.

A pH management system of a liquid chromatograph according to one aspect of the present invention includes a pH meter that measures a pH value of a mobile phase in the liquid chromatograph, and a warner that presents a warning in a case where it is determined that a pH value measured in the pH meter is different from a set pH value, or that the pH value measured in the pH meter deviates from the set pH value and an error rate exceeds a predetermined error rate, when the pH value measured in the pH meter and the set pH are compared to each other.

A pH management system of a liquid chromatograph according to another aspect of the present invention includes a pH meter that measures a pH value of a mobile phase in the liquid chromatograph, and a pH saver that saves a pH value measured in the pH meter in association with a result of an analysis performed in the liquid chromatograph.

Other features, elements, characteristics, and advantages of the present disclosure will become more apparent from the following description of preferred embodiments of the present disclosure with reference to the attached drawings.

DETAILED DESCRIPTION

A pH management system and a pH management program of a liquid chromatograph according to embodiments of the present invention will now be described with reference to the attached drawings.

[1] First Embodiment (1) Configuration of Analysis System

Figure 1:
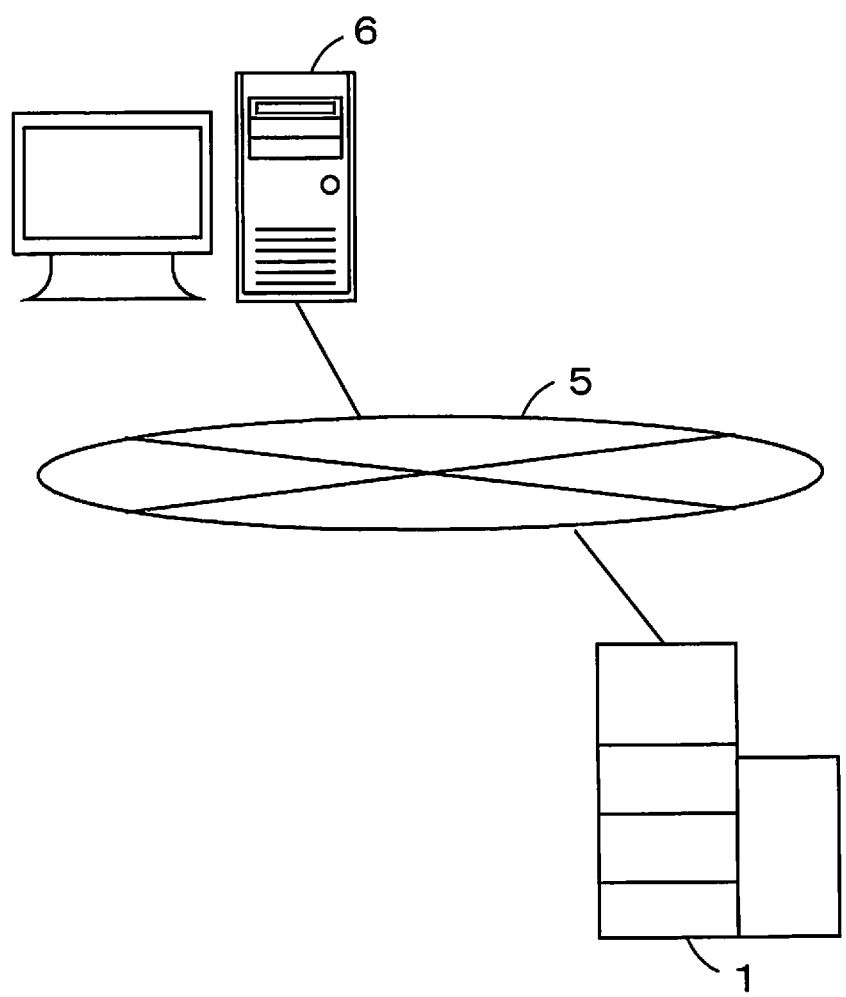
FIG. 1 is an overview of an analysis system according to the present embodiment.

First, a first embodiment of the pH management system and the pH management program of the liquid chromatograph according to the present invention will be described. In the first embodiment, the pH management system and the pH management program acquire a pH value of a mobile phase on which an analysis process is being executed and determines whether a pH value is abnormal. FIG. 1 is an overview of an analysis system according to the embodiment. The analysis system includes the liquid chromatograph 1, a communication network 5 and an analysis computer 6. The liquid chromatograph 1 and the analysis computer 6 are connected to the communication network 5 and can communicate with each other.

The analysis computer 6 executes a process of creating an analysis method to be set in the liquid chromatograph 1. The analysis method created in the analysis computer 6 is supplied to a system controller included in the liquid chromatograph 1 through the communication network 5. The liquid chromatograph 1 executes an analysis process by control of the system controller. A result of an analysis performed in the liquid chromatograph 1 is supplied to the analysis computer 6 through the communication network 5. The analysis computer 6 executes a process of examining or displaying of a result of an analysis performed by the liquid chromatograph 1, etc.

(2) Configuration of Liquid Chromatograph

Figure 2:
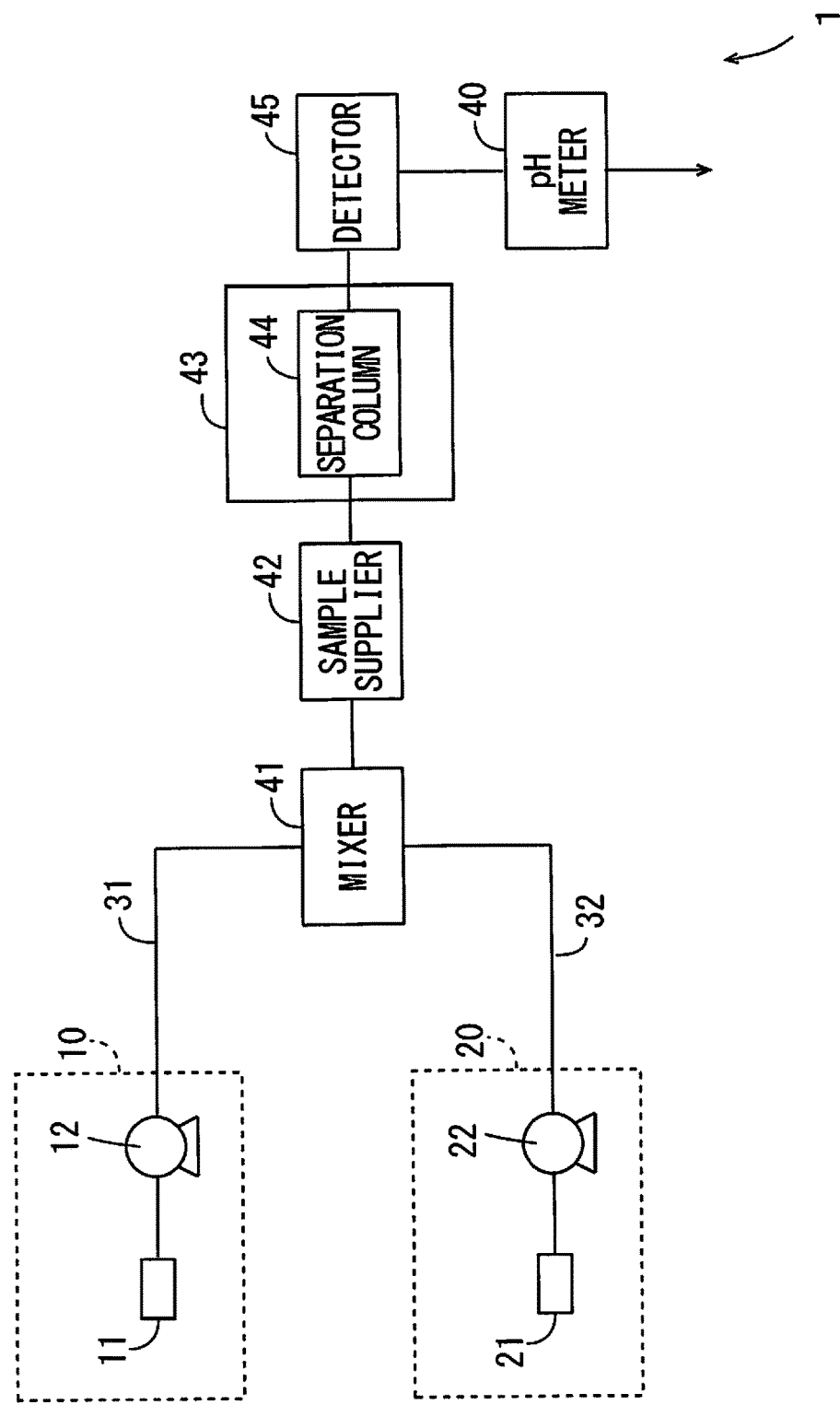
FIG. 2 is a diagram showing the configuration of a liquid chromatograph according to a first embodiment.

FIG. 2 is a diagram showing the configuration of the liquid chromatograph 1 according to the first embodiment of the present invention. As shown in FIG. 1, in the present embodiment, the liquid chromatograph 1 includes a first aqueous solvent supplier 10, a second aqueous solvent supplier 20, a mixer 41, a sample supplier 42, a column oven 43, a detector 45 and a pH meter 40. A separation column 44 is contained in the column oven 43.

The first aqueous solvent supplier 10 includes a solvent bottle 11 and a liquid sending pump 12. The solvent bottle 11 stores an aqueous solvent. The liquid sending pump 12 pumps the aqueous solvent stored in the solvent bottle 11 to a flow path 31. The second aqueous solvent supplier 20 includes a solvent bottle 21 and a liquid sending pump 22. The solvent bottle 21 stores an aqueous solvent. The liquid sending pump 22 pumps the aqueous solvent stored in the solvent bottle 21 to a flow path 32. Aqueous solvents having different pHs are stored in the solvent bottle 11 and the solvent bottle 21 in the present embodiment.

The mixer 41 is connected to a position farther downstream than the flow path 31 and the flow path 32. Aqueous solvents flowing through the flow path 31 and the flow path 32 flow into the mixer 41. The mixer 41 is a gradient mixer in the present embodiment. The mixer 41 generates various solvents (mobile phases) by mixing the aqueous solvent pumped by the liquid sending pump 12 and the aqueous solvent pumped by the liquid sending pump 22 at any ratio. As described above, in the present embodiment, aqueous solvents having different pHs are stored in the solvent bottle 11 and the solvent bottle 21. Therefore, in the mixer 41, the liquid chromatograph 1 runs a pH gradient by changing the mixture ratio of two aqueous solvents.

The sample supplier 42 is an autosampler, for example. The sample supplier 42 injects a sample to be analyzed into the analysis flow path through which a mobile phase flows at a position farther downstream than the mixer 41.

The column oven 43 is arranged at a position farther downstream than the sample supplier 42. The column oven 43 contains the separation column 44. The temperature of the separation column 44 is maintained by the column oven 43 at a temperature set in an analysis method. A mobile phase and a sample are supplied to the separation column 44. In the separation column 44, substances included in the sample are separated.

The detector 45 is arranged at a position farther downstream than the column oven 43. The detector 45 detects a sample that has been separated into components in the separation column 44. As the detector, a UV-visible spectrophotometer, a diode array detector or a differential refractometer is used, for example.

The pH meter 40 is arranged at a position farther downstream than the detector 45. The pH meter 40 measures a pH value of a mobile phase that has been discharged from the detector 45. As described above, in the present embodiment, the liquid chromatograph 1 runs a pH gradient. Therefore, a pH value measured in the pH meter 40 changes in accordance with a mixture ratio of two aqueous solvents in the mixer 41. It is possible to acquire a pH value of an aqueous solvent that is mixed based on the setting of a pH gradient by arranging the pH meter 40 at a position farther downstream than the detector 45. Further, the pH meter 40 is arranged in the flow path, having a small solvent pressure, located farther downstream than the detector 45 as compared to the flow path located farther upstream than the separation column 44. Thus, application of a large pressure to the pH meter 40 can be avoided, so that the pH meter 40 can be protected.

Figure 3:
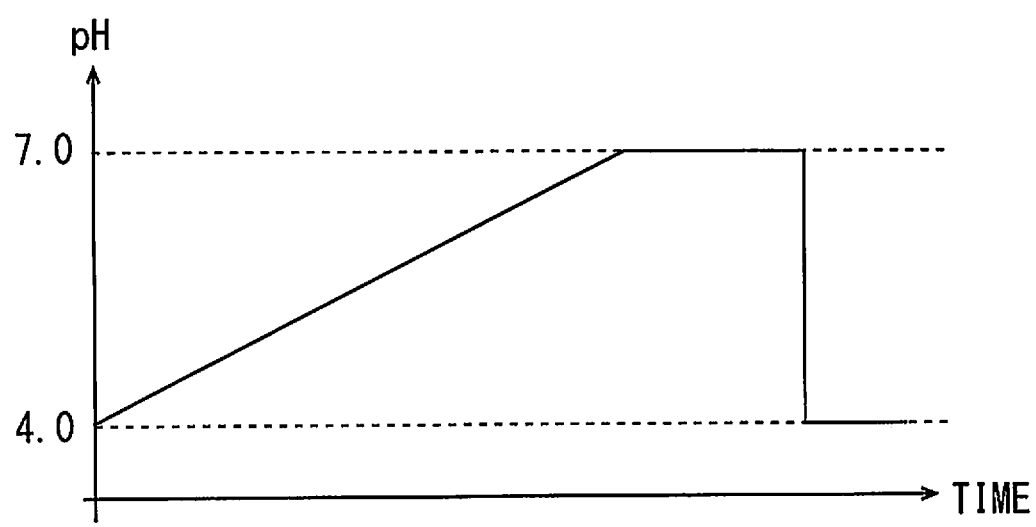
FIG. 3 is a diagram showing one example of a pH gradient set in an analysis method.

FIG. 3 is a diagram showing one example of a pH gradient set in analysis method data AM. In FIG. 3, the abscissa indicated the time, and the ordinate indicates the pH value of a mobile phase. As shown in FIG. 3, in this pH gradient, it is set that the pH value of the mobile phase increases from 4 to 7. Further, it is set that the pH value of the mobile phase decreases to 4 after being kept at 7.

(3) Configuration of Analysis Computer

Figure 4:
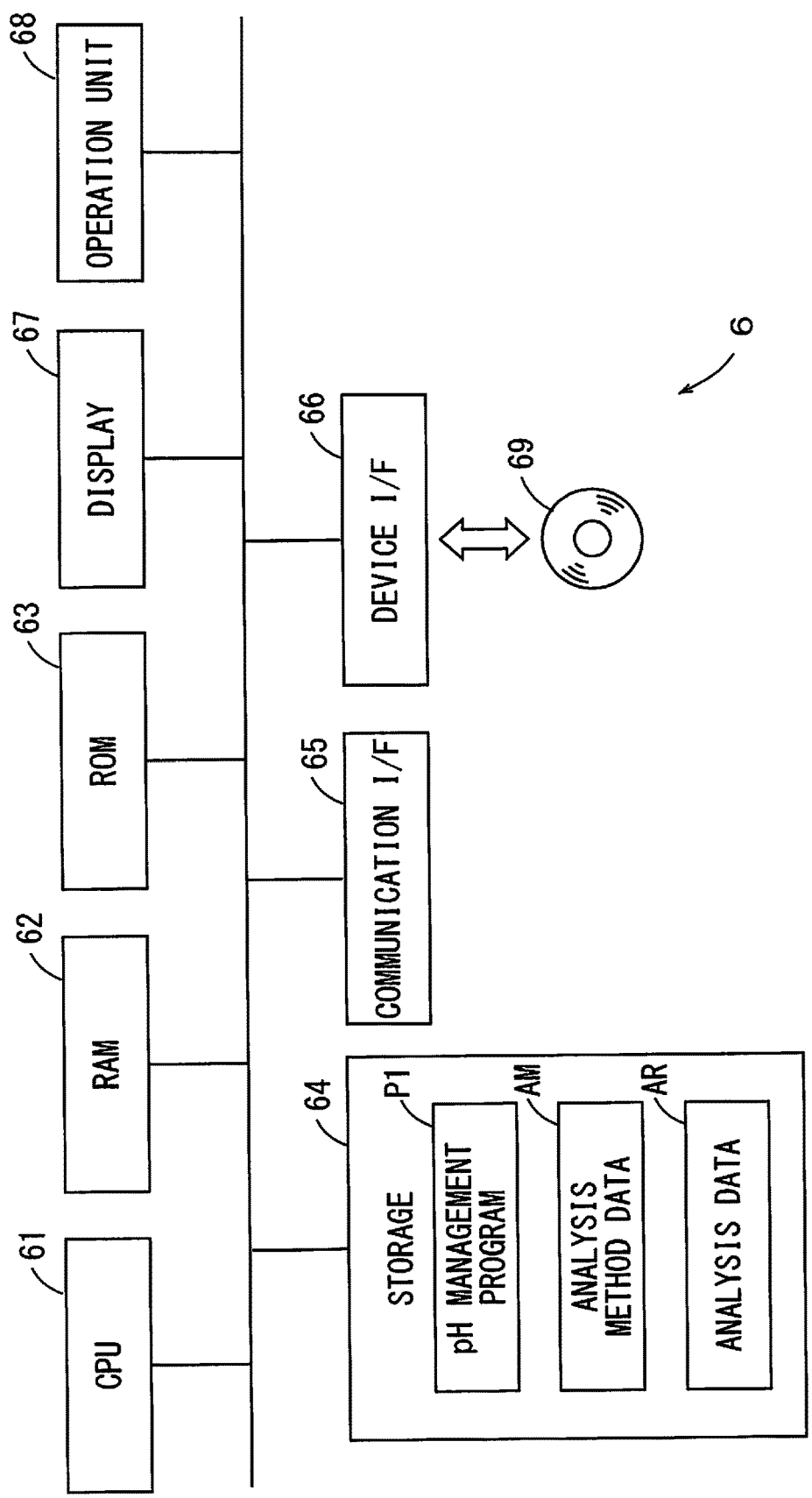
FIG. 4 is a diagram showing the configuration of an analysis computer of the present embodiment.

Next, the configuration and functions of the computer 6 according to the present embodiment will be described. FIG. 4 is a diagram showing the configuration of the analysis computer 6 according to the present embodiment. As shown in FIG. 4, the analysis computer 6 includes a CPU (Central Processing Unit) 61, a RAM (Random Access Memory) 62, a ROM (Read Only Memory) 63, a storage 64, a communication interface (I/F) 65, a device interface (I/F) 66, a display 67 and an operation unit 68. As the analysis computer 6, a personal computer is used, for example.

The CPU 61 controls the entire analysis computer 6. The RAM 62 is used as a work area for execution of a program by the CPU 61. A control program and so on are stored in the ROM 63. In the display 67, information such as a result of analysis is displayed. The operation unit 58 receives a user's input operation. The operation unit 68 includes a keyboard, a mouse, etc.

The storage 64 is a storage device such as a hard disc. In the storage 64, a pH management program P1, the analysis method data AM and analysis data AR are stored. The pH management program P1 is a program for managing the pH value of a mobile phase flowing through the liquid chromatograph 1.

The communication interface 65 is an interface that communicates with another computer through wireless or wired communication. As shown in FIG. 1, the communication interface 65 is connected to the communication network 5. The analysis computer 6 transmits data to and receives data from the liquid chromatograph 1 through the communication interface 65. The device interface 66 is an interface that accesses a storage medium 69 such as a CD, a DVD or a semiconductor memory.

Figure 5:
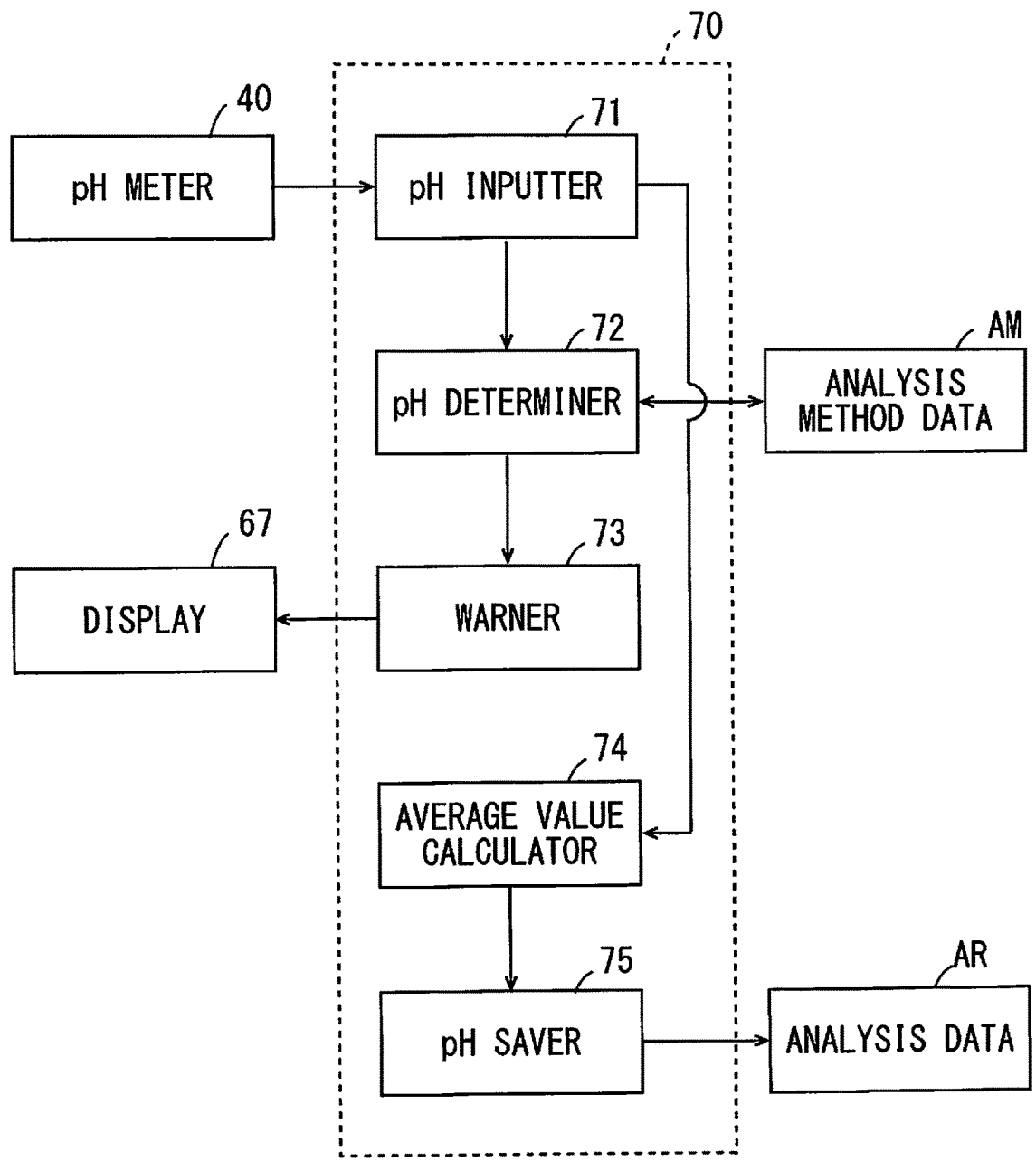
FIG. 5 is a block diagram showing the functions of the analysis computer.

FIG. 5 is a block diagram showing the functional configuration of the analysis computer 6. In FIG. 5, the controller 70 is a function that is implemented by execution of the pH management program P1 by the CPU 61 while the CPU 61 uses the RAM 62 as a work area. The controller 70 includes a pH inputter 71, a pH determiner 72, a warner 73, an average value calculator 74 and a pH saver 75. That is, the pH inputter 71, the pH determiner 72, the warner 73, the average value calculator 74 and the pH saver 75 are functions implemented by execution of the pH management program P1.

The pH inputter 71 inputs a pH value of a mobile phase measured in the pH meter 40. The pH inputter 71 acquires a pH value from the liquid chromatograph 1 through the communication network 5. The pH determiner 72 compares a pH value input by the pH inputter 71 with a pH value set in the analysis method data AM. In a case where it is determined that a pH value measured in the pH meter 40 is different from a pH value set in the analysis method data AM, or that the pH value measured in the pH meter 40 deviates from the pH value set in the analysis method data AM and its error rate exceeds a predetermined error rate, the pH determiner 72 determines that the pH value is abnormal. In a case where the pH determiner 72 determines that a pH value is abnormal, the warner 73 displays warning information in regard to the pH value in the display 67. The average value calculator 74 and the pH saver 75 will be described in the second embodiment.

(4) pH Management Method

Figure 6:
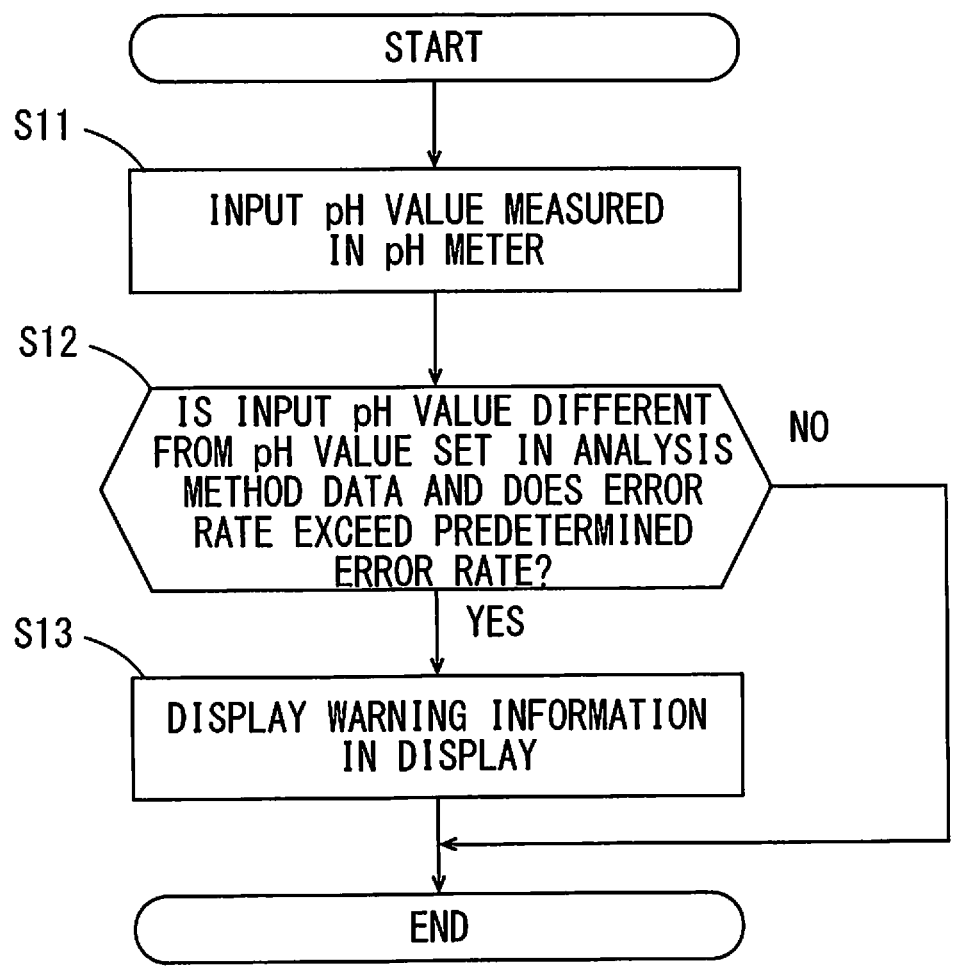
FIG. 6 is a flowchart showing a flow of a process of a pH management program.

The pH management method according to the present embodiment will be described next. FIG. 6 is a flowchart showing the pH management method according to the present embodiment. First, in the step S11, the pH inputter 71 inputs a pH value measured in the pH meter 40. For example, the pH inputter 71 measures the time using a timer and executes the step S11 at predetermined time intervals.

Next, in the step S12, the pH determiner 72 determines whether a pH value input by the pH inputter 71 is different from a pH value set in analysis method data, or whether the pH value input by the pH inputter 71 deviates from the pH value set in the analysis method data and its error rate exceeds a predetermined error rate. Specifically, the pH determiner 72 refers to the analysis method data AM and acquires the pH value set in the analysis method data AM. In the present embodiment, because the liquid chromatograph 1 runs a pH gradient, the pH determiner 72 acquires a range of pH value set in the analysis method data AM. Then, the pH determiner 72 determines whether the pH value input by the pH inputter 71 falls in the range obtained when the error rate is reflected in the range of pH value set in the analysis method data AM. In a case where the input pH value deviates from the range obtained when the error rate is reflected in the range of pH value, the pH determiner 72 determines that the pH value is abnormal.

For example, in a case where the pH gradient shown in FIG. 3 is set in the analysis method data AM, the pH determiner 72 acquires a range of pH value, the lower limit value of which is 4 and the upper limit value of which is 7. Then, the pH determiner 72 determines whether a pH value input by the pH inputter 71 falls in the range obtained when the error rate is reflected in the range, the lower limit value of which is 4 and the upper limit value of which is 7. For example, in a case where the error rate is set to $\alpha$ (%), whether the input pH value is in the range from $4(1-\alpha/100)$ to $7(1+\alpha/100)$ is determined. The error rate may be suitably settable by a user. It is possible to strictly manage a pH value by setting the error rate $\alpha$ to a small value. "0" may be set as the error rate $\alpha$.

In the step S12, in a case where it is determined that the input pH value is different from the set pH value, or that the input pH value deviates from the set pH value and its error rate exceed a predetermined error rate, the warner 73 displays warning information in the display 67 in the step S13. For example, the warner 73 displays a message indicating that a pH value of a mobile phase in the liquid chromatograph 1 is abnormal in the display 67. The warner 73 may display a value of the pH value set in the analysis method and a measured pH value for comparison. Further, the warner 73 may display a selection screen for selection in regard to whether an analysis process in the liquid chromatograph 1 is to be stopped in the display 67. The user inputs an instruction for stopping or not stopping the analysis process by operating the operation unit 68. In a case where receiving an instruction for stopping the analysis process, the warner 73 can transmit this instruction to the system controller of the liquid chromatograph 1. In response to this instruction, the system controller can stop the analysis process in the liquid chromatograph 1.

In the above-mentioned embodiment, because the pH gradient is run in the liquid chromatograph 1, the measured pH value is compared to the range obtained when the error rate is reflected in the upper limit value and the lower limit value of the pH gradient. In a case where a certain pH value is set as an analysis method, a measured pH value may be compared to the range obtained when an error rate is reflected in the set pH value.

In this manner, with the pH management system and the pH management program of the liquid chromatograph of the first embodiment, in a case where the pH value of a mobile phase indicates an abnormal value, the user can be warned. Thus, the user can properly manage the pH value of a mobile phase flowing through the liquid chromatograph 1. Thus, a high resolution chromatogram can be obtained in accordance with an analysis condition that is optimized by method scouting.

Figure 9:
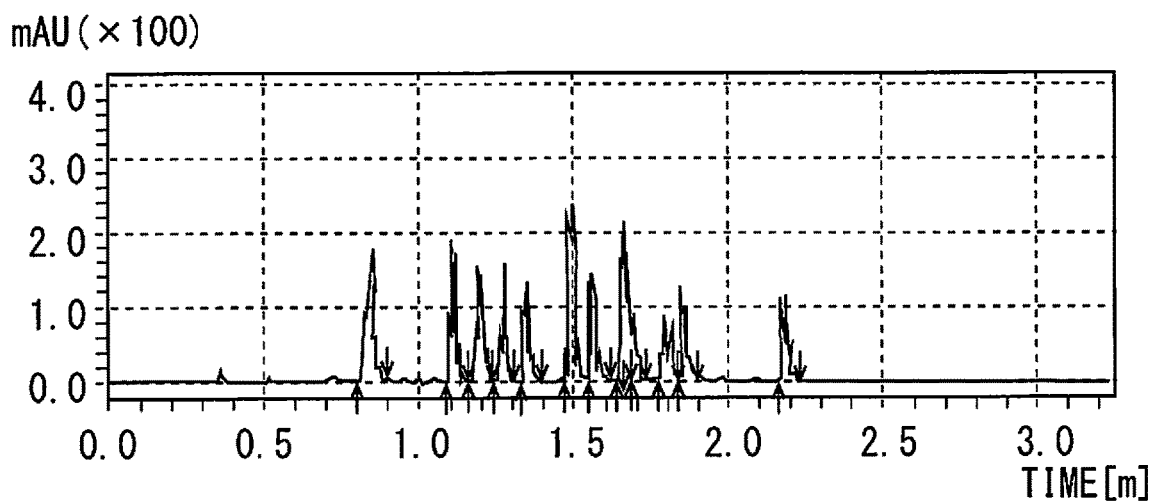
FIG. 9 is a diagram showing a chromatogram based on a difference in pH.
Figure 10:
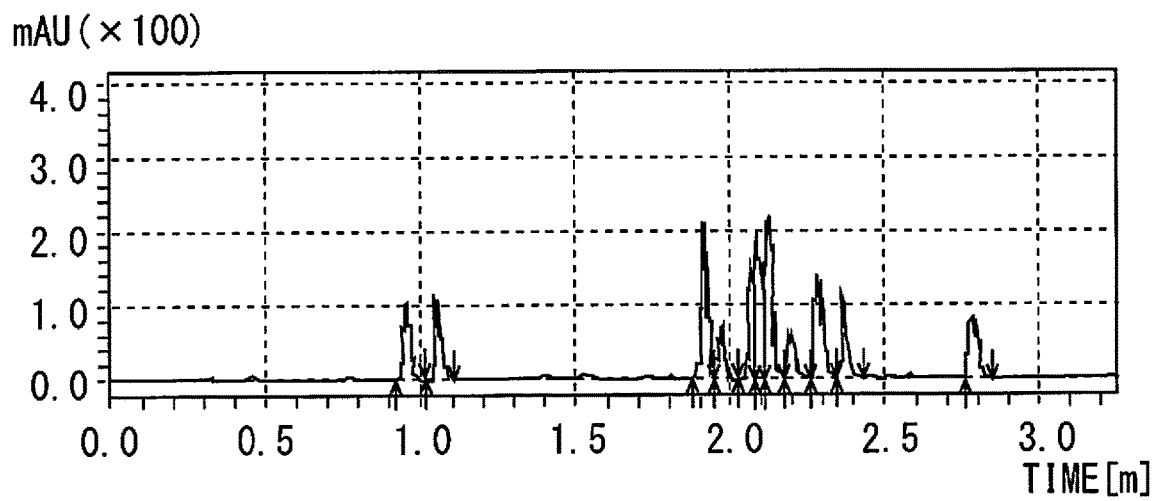
FIG. 10 is a diagram showing a chromatogram based on a difference in pH.

FIGS. 9 and 10 are diagrams showing a large difference in result of analysis due to a difference in pH value of a mobile phase even with the same sample. FIG. 9 is a chromatogram obtained by utilization of following solvents A, B.

A: 10 mmol/L of Sodium citrate (pH 3.1)

B: Methanol

FIG. 10 is a chromatograph obtained by utilization of following solvents A, B.

A: 10 mmol/L of ammonium acetate (pH 4.7)

B: Methanol and Acetonitrile (50:50)

In regard to both of FIGS. 9 and 10, the concentration of B was set to 90% after 5 minutes elapsed from the start of supply of solvent, and a gradient for lowering the concentration of B from 90% to 70% was run from a point in time at which 5 minutes elapsed from the start of supply of solvent to a point in time at which 7 minutes elapsed from the start of supply of solvent. In FIG. 10, it is found that peaks are concentrated around a point in time at which 2 minutes has elapsed from the start of a detection process, and resolution is not good. In contrast, peak resolution is good in FIG. 9.

Further, for example, a flow of a strongly acidic or strongly alkaline mobile phase into the device of the liquid chromatograph 1 can be avoided. In particular, it is possible to protect the separation column 44 by avoiding a flow of a strongly acidic or strongly alkaline mobile phase into the separation column 44. For example, during preparation of an aqueous solvent, even in a case where being adjusted correctly by a user, a pH value may change due to an environment such as a case where some time has elapsed from the time of preparation of solvent to the time of the analysis process. Even in such a case, the pH value of a mobile phase can be managed properly.

[2] Second Embodiment (1) Configuration of Liquid Chromatograph

Next, a pH management system and a pH management program of a liquid chromatograph according to a second embodiment of the present invention will be described. The configuration and functions of an analysis computer 6 in the second embodiment are similar to those of the first embodiment described with reference to FIGS. 4 and 5. Further, the overall configuration of an analysis system is similar to the configuration shown in FIG. 1. In the second embodiment, the pH management system and the pH management program save a pH value of a mobile phase when an analysis process is executed.

Figure 7:
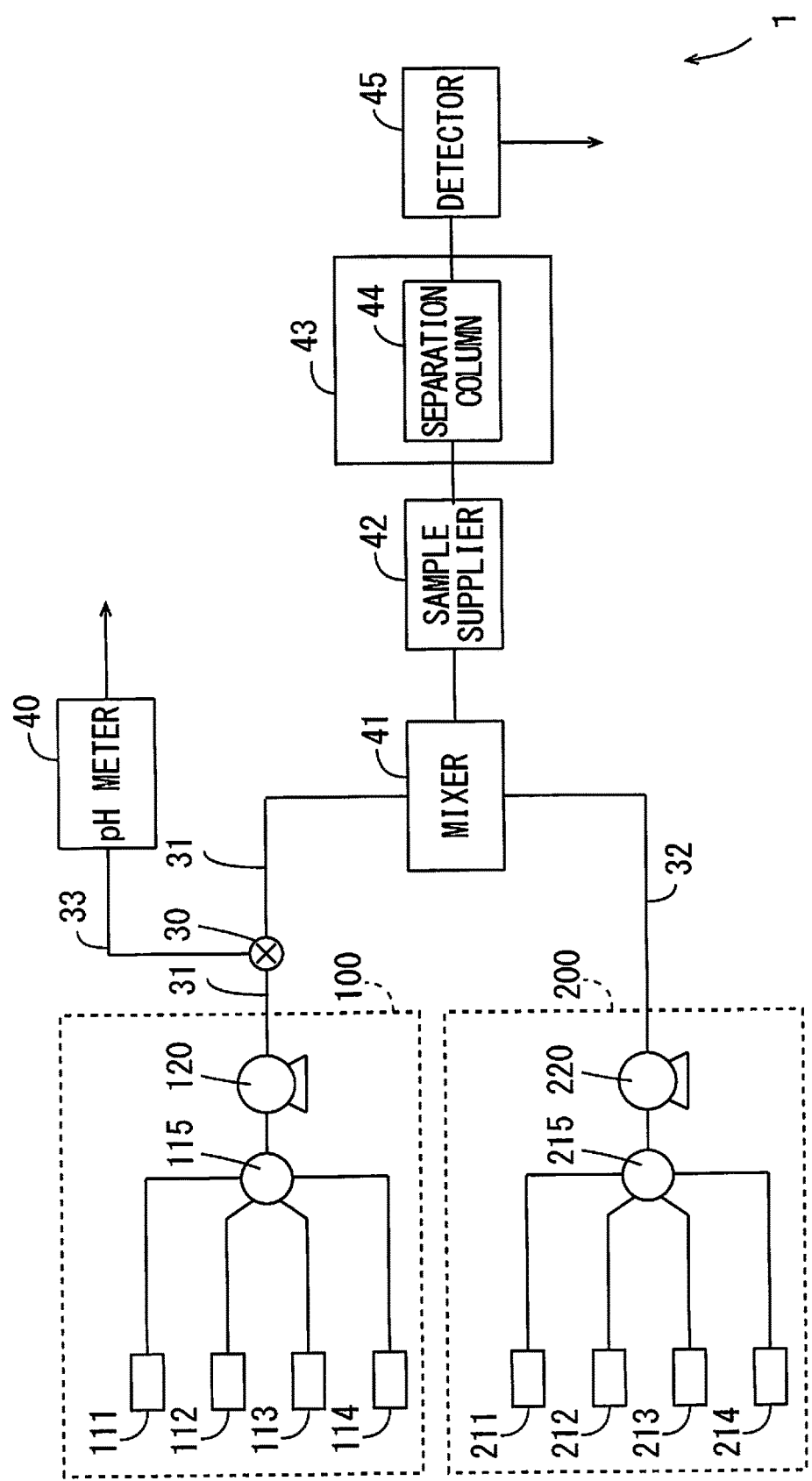
FIG. 7 is a diagram showing the configuration of a liquid chromatograph according to a second embodiment.

FIG. 7 is a diagram showing the configuration of a liquid chromatograph 1 according to the second embodiment of the present invention. As shown in FIG. 7, in the present embodiment, the liquid chromatograph 1 includes an aqueous solvent supplier 100, an organic solvent supplier 200, a flow path switch valve 30, a pH meter 40, a mixer 41, a sample supplier 42, a column oven 43 and a detector 45.

The aqueous solvent supplier 100 includes a plurality (four in the present example) of solvent bottles 111 to 114, a flow path switch valve 115 and a liquid sending pump 120. The solvent bottles 111 to 114 respectively store different types of aqueous solvents. The flow path switch valve 115 selects one or a plurality of solvent bottles from the solvent bottles 111 to 114 by switching the flow paths between the flow path switch valve 115 and the solvent bottles 111 to 114. The liquid sending pump 120 pumps an aqueous solvent stored in the one or plurality of solvent bottles selected by the flow path switch valve 115 to the flow path 31.

The organic solvent supplier 200 includes a plurality (four in the present example) of solvent bottles 211 to 214, a flow path switch valve 215 and a liquid sending pump 220. The solvent bottles 211 to 214 respectively store different types of organic solvents. The flow path switch valve 215 selects one or a plurality of solvent bottles from the solvent bottles 211 to 214 by switching the flow paths between the flow path switch valve 215 and the solvent bottles 211 to 214. The liquid sending pump 220 pumps an organic solvent stored in the one or plurality of solvent bottles selected by the flow path switch valve 215 to the flow path 32.

The configurations of the mixer 41, the sample supplier 42, the column oven 43, the separation column 44 and the detector 45 are similar those of the first embodiment. The mixer 41 mixes the aqueous solvent pumped by the liquid sending pump 120 and the organic solvent pumped by the liquid sending pump 220 at any ratio.

Differently from the first embodiment, the pH meter 40 is provided in a flow path 33 that branches from the flow path 31. The flow path 33 is connected to the flow path switch valve 30 provided in the flow path 31. In the second embodiment, in a mode in which the pH value of a mobile phase is measured, the flow path switch valve 30 is switched such that the aqueous solvent pumped by the liquid sending pump 120 flows into the flow path 33. On the other hand, in a mode in which an analysis process is executed, the flow path switch valve 30 is switched such that the aqueous solvent pumped by the liquid sending pump 120 flows into the mixer 41.

In the second embodiment, because one solvent supplier is the organic solvent supplier 200, the pH value of a mobile phase can be obtained in the flow path 33 that branches from the flow path 31. That is, the pH value of the aqueous solvent can be obtained before the aqueous solvent is mixed with the organic solvent in the mixer 41. The flow path diameter of the flow path 33 can be larger than the flow path diameter of each of the flow paths 31, 32. Thus, application of a large pressure to the pH meter 40 arranged in the flow path 33 can be avoided, so that the pH meter 40 can be protected.

(2) pH Management Method

Figure 8:
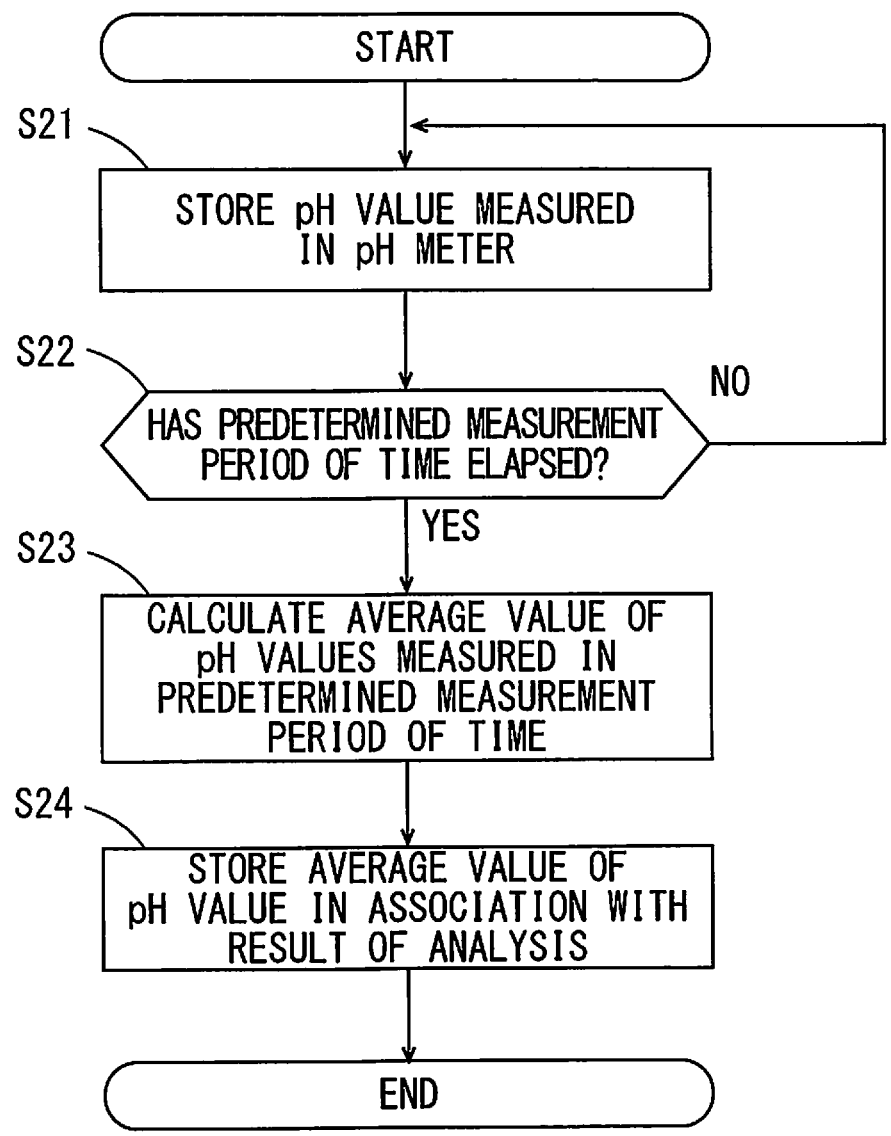
FIG. 8 is a flowchart showing a flow of a process of a pH management program.

Next, a pH management method according to the present embodiment will be described. FIG. 8 is a flowchart showing the pH management method according to the present embodiment. First, in the step S21, the pH inputter 71 inputs a pH value measured in the pH meter 40 and stores the input pH value in the storage 64.

Next, in the step S22, the pH inputter 71 determines whether a predetermined measurement period of time has elapsed. In a case where the predetermined measurement period of time has not elapsed yet, the process returns to the step S21. The pH inputter 71 inputs a pH value newly measured in the pH meter 40 and stores the input pH value in the storage 64. The pH inputter 71 repeats the process of the step S21 until the predetermined measurement period of time elapses. Thus, the storage 64 accumulates pH values that are input and stored in the predetermined measurement period of time.

In a case where it is determined that the predetermined measurement period of time has elapsed in the step S22, the average value calculator 74 acquires a plurality of pH values that are stored in the storage 64 in the predetermined measurement period of time and calculates their average value.

Next, in the step S24, the pH saver 75 saves the calculated average value of the pH values in the storage 64 in association with a result of analysis. For example, when an analysis process in regard to one analysis method is executed, the liquid chromatograph 1 is in a pH measurement mode in a predetermined period of time from the start of the analysis process. In the pH measurement mode, all of an aqueous solvent that flows into the flow path switch valve 30 is sent to the flow path 33 by control of the flow path switch valve 30. Thus, the pH value of a mobile phase is measured in the pH meter 40, and the steps in the flow of FIG. 8 are performed. For example, the chromatograph 1 can be in the pH measurement mode for a period of one to two minutes from the start of the analysis process. When the average value of pH values is calculated, and the pH measurement mode ends, the chromatograph 1 switches to an analysis mode. In the analysis mode, all of an aqueous solvent that flows into the flow path switch valve 30 is sent to the mixer 41 by control of the flow path switch valve 30. Thus, an analysis process is executed. The pH saver 75 can save the average value of pH values calculated in the pH measurement mode in the storage 64 as analysis data AR in association with an obtained result of an analysis that is performed immediately afterward in the analysis mode.

Alternatively, one analysis method for a pH measurement mode may be created. In this case, two analysis methods having same analysis parameter are created in the analysis method data AM. One of the two analysis methods is executed in the pH measurement mode, and the other method is executed in the analysis mode. Then, it is possible to save the average value of pH values obtained in the pH measurement mode as the analysis data AR in association with a result of analysis obtained in the analysis mode by managing these two analysis methods as a pair.

In this manner, with the pH management system and the pH management program of the liquid chromatograph of the second embodiment, the pH value of a mobile phase obtained when the analysis process is executed can be saved in association with a result of analysis. Thus, the pH value of a mobile phase flowing through the liquid chromatograph 1 can be managed properly.

In method scouting, the user sets the type of a mobile phase, the type of a column and so on and sets the structural ratio of the mobile phase. The user makes various changes in structural ratio of the mobile phase to create a plurality of analysis methods. That is, a plurality of analysis methods in regard to mobile phases having different pH values are created. The liquid chromatograph 1 executes an analysis process in accordance with a plurality of analysis methods in regard to these mobile phases having different pH values. Even in a case where a series of analysis processes is executed on mobile phases having different pH values in this manner, the user can make reference to results of the series of analysis processes and the actual pH values of mobile phases at the time of the analysis process with the pH management system and the pH management program of the present embodiment. Thus, the user can compare and study results of analysis based on differences in pH value.

[3] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the flow path 31 is an example of a first flow path, and the flow path 32 is an example of a second flow path. Further, in the above-mentioned embodiment, the analysis computer 6 is an example of a computer.

As each of constituent elements recited in the claims, various other elements having configurations or functions described in the claims can be also used.

[4] Other Embodiments

In the above-mentioned first embodiment, the pH meter 40 is arranged at a position farther downstream than the detector 45. In a modified example, the pH meter 40 can be arranged at a position farther upstream than the detector 45. For example, the pH meter 40 may be arranged in the flow path between the mixer 41 and the column oven 43, or may be arranged in the flow path between the column oven 43 and the detector 45. However, in a case where the pH meter 40 is arranged at a position farther upstream than the column oven 43, it is desirable that a device having high pressure resistance is used as the pH meter 40 since the pressure of a solvent flowing through the flow path is high.

In the above-mentioned first embodiment, in the liquid chromatograph 1 shown in FIG. 2, the pH value of a mobile phase is acquired by the pH meter 40 provided at a position farther downstream than the detector 45, and the user is warned when it is determined that the pH value is abnormal. In another embodiment, in the liquid chromatograph 1 according to the second embodiment shown in FIG. 7, the pH value of a mobile phase may be acquired by the pH meter 40 provided in the flow path 33, and the user may be warned when it is determined that the pH value is abnormal.

In the above-mentioned second embodiment, in the liquid chromatograph 1 shown in FIG. 7, the pH value of a mobile phase obtained when an analysis process is executed is saved by the pH meter 40 provided in the flow path 33. In another embodiment, in the liquid chromatograph 1 according to the first embodiment shown in FIG. 2, the pH value of a mobile phase, obtained by the pH meter 40 provided at a position farther downstream than the detector 45 when an analysis process is executed, may be saved.

In the above-mentioned embodiment, the pH management program P1 is saved in the storage 64, by way of example. In another embodiment, the pH management program P1 may be saved in the storage medium 69 for provision. The CPU 61 of the analysis computer 6 may access the storage medium 69 through the device interface 66, and may save the pH management program P1 saved in the storage medium 69 in the storage 64 or the ROM 63. Alternatively, the CPU 61 may access the storage medium 69 through the device interface 66 and may execute the pH management program P1 saved in the storage medium 69.

In the above-mentioned first embodiment, the warner 73 provides a warning by comparing a pH value measured in the pH meter 40 to a pH value set in the analysis method data AM, by way of example. In another embodiment, a pH value measured in the pH meter 40 may be compared to a pH value set for each separation column. For example, in regard to a plurality of separation columns, the information that associates respective identification information pieces with a usable range of pH value of a mobile phase is stored in the storage 64. The warner 73 can provide a warning in a case where a pH value measured in the pH meter 40 exceeds the usable pH value of a mobile phase with respect to the separation column.

In the above-mentioned second embodiment, the average value of pH values obtained in the pH measurement mode is saved in association with a result of analysis obtained in the analysis mode. In another embodiment, an intermediate value, a maximum value or a minimum value of pH values obtained in the pH measurement value may be saved in association with a result of analysis obtained in the analysis mode. Alternatively, all pH values measured in a predetermined period of time or the graph of pH values may be saved in association with a result of analysis.

[5] Aspects

It is understood by those skilled in the art that the plurality of above-mentioned illustrative embodiments are specific examples of the below-mentioned aspects.

(Item 1) A pH management system of a liquid chromatograph according to one aspect of the present includes a pH meter that measures a pH value of a mobile phase in the liquid chromatograph, and a warner that presents a warning in a case where it is determined that a pH value measured in the pH meter is different from a set pH value, or that the pH value measured in the pH meter deviates from the set pH value and an error rate exceeds a predetermined error rate, when the pH value measured in the pH meter and the set pH are compared to each other.

The pH of a mobile phase flowing through the liquid chromatograph can be managed properly.

(Item 2) The pH management system of a liquid chromatograph according to item 1, wherein the set pH value may be set in analysis method data of the liquid chromatograph.

The pH of a mobile phase can be managed properly based on a pH value set in the analysis method data.

(Item 3) The pH management system of a liquid chromatograph according to item 2, wherein the analysis method data may include a setting for a pH gradient, and the warner may present a warning in a case where it is determined that a pH value measured in the pH meter deviates from an upper limit value and a lower limit value of a pH range of the pH gradient and an error rate exceeds a predetermined error rate.

When a pH gradient is run, the pH of a mobile phase can be managed properly.

(Item 4) The pH management system of a liquid chromatograph according to any one of items 1 to 3, wherein the pH meter may be provided at a position farther downstream than a detector included in the liquid chromatograph.

Since the pressure of a solvent is low in the downstream of the detector, application of a large pressure to the pH meter can be prevented.

(Item 5) A pH management system of a liquid chromatograph according to another aspect of the present invention includes a pH meter that measures a pH value of a mobile phase in the liquid chromatograph, and a pH saver that saves a pH value measured in the pH meter in association with a result of an analysis performed in the liquid chromatograph.

The pH of a mobile phase flowing through the liquid chromatograph can be managed properly.

(Item 6) The pH management system of a liquid chromatograph according to item 5 may further include an average value calculator that calculates an average value of pH values measured in the pH meter, wherein the pH saver may save the average value of pH values calculated in the average value calculator in association with a result of an analysis performed in the liquid chromatograph.

The pH of a mobile phase flowing in the liquid chromatograph can be managed properly based on an average value of pH values measured in the pH meter.

(Item 7) The pH management system of a liquid chromatograph according to item 5 or 6, wherein the liquid chromatograph may include a first flow path that supplies an aqueous solvent, a second flow path that supplies an organic solvent, and a mixer that mixes the aqueous solvent supplied through the first flow path and the organic solvent supplied through the second flow path, wherein the pH meter may measure a pH value of the aqueous solvent that flows through the first flow path.

The pH value of an aqueous solvent can be acquired before the aqueous solvent is mixed with an organic solvent. Thus, a pH value that affects a result of analysis can be saved.

(Item 8) The pH management system of a liquid chromatograph according to any one of items 5 to 7 may further include a storage that stores analysis method data, wherein an analysis method for measuring a pH value in the pH meter may be included in the analysis method data.

It is possible to acquire a pH value without affecting an analysis process by creating an analysis method dedicated to the measurement of pH.

(Item 9) A computer readable recording medium recording a pH management program of a liquid chromatograph according to another aspect of the present invention causes a computer to execute the processes of inputting a pH value of a mobile phase measured in a pH meter in the liquid chromatograph, determining whether a pH value measured in the pH meter is different from a set pH value, or whether the pH value measured in the pH meter deviates from the set pH value and an error rate exceeds a predetermined error rate, and presenting a warning in a case where it is determined that a measured pH value is different from the set pH value, or that the measured pH value deviates from the set pH value and an error rate exceeds a predetermined error rate.

(Item 10) A computer readable recording medium recording a pH program of a liquid chromatograph according to another aspect of the present invention causes a computer to execute the processes of inputting a pH value of a mobile phase measured in a pH meter in the liquid chromatograph, and saving an input pH value in association with a result of an analysis performed in the liquid chromatograph.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A pH management system of a liquid chromatograph, the liquid chromatograph comprising:
   a first flow path that supplies an aqueous solvent;
   a second flow path that supplies an organic solvent;
   a mixer that mixes the aqeuous solvent supplied through the first flow path and the organic solvent supplied through the second flow path;
   a branch flow path branching from the first flow path; and
   a flow path switching valve provided between the first flow path and the branch low path;
   wherein the system comprises:
   a pH meter disposed on the branch flow path and configured to measure a pH value of the mobile phase in the liquid chromatograph; and
   a pH saver that saves a pH value measured in the pH meter in association with a result of an analysis performed in the liquid chromatograph;
   wherein in a mode for measuring the pH value of the mobile phase, the flow path switching valve is controlled to direct the aqueous solvent from the first flow path into the branch flow path, so that the pH meter measures the pH value of the aqueous solvent;
   wherein in a mode for performing an analysis related to an analysis method using the liquid chromatograph, the flow path switching valve is controlled to direct the aqueous solvent from the first flow path into the mixer, and
   the pH saver saves, for each analysis performed using the liquid chromatograph, the pH value measured by the pH meter in the mode for measuring the pH value of the mobile phase, in association with the result of the analysis performed in the mode for performing the analysis.

2. The pH management system of a liquid chromatograph according to claim 1, further comprising an average value calculator that calculates an average value of pH values measured in the pH meter, wherein
   the pH saver saves the average value of pH values calculated in the average value calculator in association with a result of an analysis performed in the liquid chromatograph.

3. The pH management system of a liquid chromatograph according to claim 1, further comprising a storage that stores analysis method data, wherein
   an analysis method for measuring a pH value in the pH meter is included in the analysis method data.

4. A computer readable recording medium recording a pH management program of a liquid chromatography the liquid chromatograph comprising:
   a first flow path that supplies an aqueous solvent;
   a second flow path that supplies an organic solvent;
   a mixer that mixes the aqueous solvent supplied through the first flow path and the organic solvent supplied through the second flow path;
   a branch flow path branching from the first flow path; and
   a flow path switching valve provided between the first flow path and the branch flow path;
   the pH management program causes a computer to execute the processes of:
   inputting a pH value of a mobile phase measured in a pH meter disposed on the branch flow path in the liquid chromatograph; and
   controlling the flow path switching valve to switch between: a mode for measuring the pH value of the mobile phase, in which the aqueous solvent is directed from the first flow path into the branch flow path so that the pH meter measures the pH value of the aqueous solvent; and a mode for performing an analysis related to an analysis method using the liquid chromatograph, in which the aqueous solvent is directed from the first flow path into the mixer; and
   saving the pH value measured by the pH meter in the mode for measuring the pH value of the mobile phase in association with a result of an analysis performed in the mode for performing the analysis using the liquid chromatograph.

* * * * *